United States Patent
Regupathy et al.

(10) Patent No.: US 11,068,041 B2
(45) Date of Patent: Jul. 20, 2021

(54) METHOD TO ENHANCE DEVICE POLICY MANAGEMENT (DPM) POWER SHARING FOR USB TYPE-C (USB-C) ONLY DEVICES

(71) Applicant: Intel Corporation, Santa Clara, CA (US)

(72) Inventors: Rajaram Regupathy, Bangalore (IN); Abdul R. Ismail, Beaverton, OR (US); Paul Sathya Chelladurai, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 15/621,558

(22) Filed: Jun. 13, 2017

(65) Prior Publication Data

US 2018/0356873 A1    Dec. 13, 2018

(51) Int. Cl.
| | | |
|---|---|---|
| *G06F 1/00* | (2006.01) | |
| *G06F 1/3234* | (2019.01) | |
| *G06F 1/3287* | (2019.01) | |
| *G06F 13/42* | (2006.01) | |
| *G06F 13/38* | (2006.01) | |
| *G06F 1/26* | (2006.01) | |

(52) U.S. Cl.
CPC ............ *G06F 1/3253* (2013.01); *G06F 1/266* (2013.01); *G06F 1/3287* (2013.01); *G06F 13/385* (2013.01); *G06F 13/4282* (2013.01)

(58) Field of Classification Search
CPC ...... G06F 1/266; G06F 1/3253; G06F 1/3287; G06F 13/385; G06F 13/428
See application file for complete search history.

(56) References Cited

U.S. PATENT DOCUMENTS

| | | | | |
|---|---|---|---|---|
| 2002/0162036 A1* | 10/2002 | Kim | ......................... | G06F 1/266 713/300 |
| 2011/0055407 A1* | 3/2011 | Lydon | .................... | G06F 13/385 709/228 |
| 2015/0046727 A1* | 2/2015 | Kobayashi | .............. | G06F 1/266 713/300 |
| 2015/0121095 A1* | 4/2015 | Tsai | ......................... | G06F 1/266 713/310 |
| 2018/0287491 A1* | 10/2018 | Muto | ...................... | G06F 1/266 |

OTHER PUBLICATIONS

"Universal Serial Bus 11 Specification," Revision 1.0, Jul. 26, 2013, 631 pages.

(Continued)

*Primary Examiner* — Nitin C Patel
(74) *Attorney, Agent, or Firm* — Nicholson De Vos Webster & Elliott, LLP

(57) ABSTRACT

A method and system for managing power for Universal Serial Bus (USB) ports, in particular USB Type-C ports that are connected to USB devices that do not support USB power delivery (USB PD). The method and system present an advertisement of a default power supply to a USB device, receive power attribute information from a USB device configuration descriptor during USB device enumeration, in response to the connecting USB device not supporting USB power deliver (USB PD), and dynamically change the power supply to meet the power requirements of the connecting USB device identified by the power attribute information.

19 Claims, 10 Drawing Sheets

(56) References Cited

OTHER PUBLICATIONS

"Universal Serial Bus Power Delivery Specification," Revision 3.0, V1 .0a, ECNs, Aug. 2, 2016, 528 pages.
"Universal Serial Bus Power Delivery Specification," Revision 3.0, V1.1, Jan. 12, 2017, 579 pages.
"Universal Serial Bus Type-C Cable and Connector Specification," Release 1.2, Mar. 25, 2016, 221 pages.
IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 2013, 18, 425 pages.
IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE Std. 802.11b-1999: "Higher Speed Physical Layer (PHY) Extension in the 24 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
Intel, BIOS Implementation of USCI Technical White Paper, Feb. 2016, Revision 001, 14 pages.
JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.
PCI Express (Registered) Base Specification Revision 3.0, Nov. 10, 2010, 860 pages.
TPM Main Part 1 "Design Principles," Specification Version 1.2, Revision 62, TCG, Oct. 2, 2003, 161 pages.
TPM Main Part 2 "TPM Structures," Specification Version 1.2, Revision 62, TCG, Oct. 2, 2003, 176 pages.
USB Type-C Connector System Software Interface [UCSI], Revision 1.0, Sep. 29, 2015, 47 pages.
WiGig White Paper, Wireless Gigabit Alliance, Defining the Future of Multi-Gigabit Wireless Communications, Jul. 2010, 5 pages.

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | $V_{BUS}$ | CC1 | D+ | D- | SBU1 | $V_{BUS}$ | RX2- | RX2+ | GND |
| GND | RX1+ | RX1- | $V_{BUS}$ | SBU2 | D- | D+ | CC2 | $V_{BUS}$ | TX2- | TX2+ | GND |
| B12 | B11 | B10 | B9 | B8 | B7 | B6 | B5 | B4 | B3 | B2 | B1 |

METHOD TO ENHANCE DEVICE POLICY MANAGEMENT (DPM) POWER SHARING FOR USB TYPE-C (USB-C) ONLY DEVICES

TECHNICAL FIELD

Embodiments of the invention relate to the field of interconnections for computing devices; and more specifically, to the operations of Universal Serial Buses in detecting power requirements and managing power utilization where there are connected devices that do not support the power delivery.

BACKGROUND

The universal serial bus (USB) standard is a standard that defines cables, connections and communication protocols used for connection, communication and power supply between electronic devices. The USB standard has evolved over time to utilize various connector types and support varying features. Amongst these USB standards is the USB Type-C standard that defines a reversible plug connector for USB devices. The Type-C plug connects to electronic devices that function as both hosts and connected devices.

Connecting an electronic device to a host device such as computing system having a motherboard, central processing unit (CPU) and similar components encompasses having circuitry that detects the connection of the electronic device. Where a device is connected via a USB Type-C connector port, there is circuitry that detects the connection of a cable and electronic device to the connector port. This enables the software and circuitry that manage the USB communication protocols to initiate communication and power controls for the connected device.

The portion of the USB 3.x standard related to power management is USB power delivery (USB PD). USB PD defines a protocol and architecture for improving power management options in comparison to previous USB standards. USB PD provides a number of improved features including increased power levels from existing USB standards up to 100 W. The power direction is no longer fixed. This enables any device with the power, whether host or peripheral to provide the power. USB PD also improves power management across multiple peripherals by allowing each device that supports USB PD to take only the power it requires, and to get more power when required for a given application. However, where connected devices do not support USB PD, even where the devices are USB Type-C, the other USB PD devices cannot provide those devices with the specific power needed and instead reserve a predetermined amount of power for these devices, which can lead to power allotment that is not optimal.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
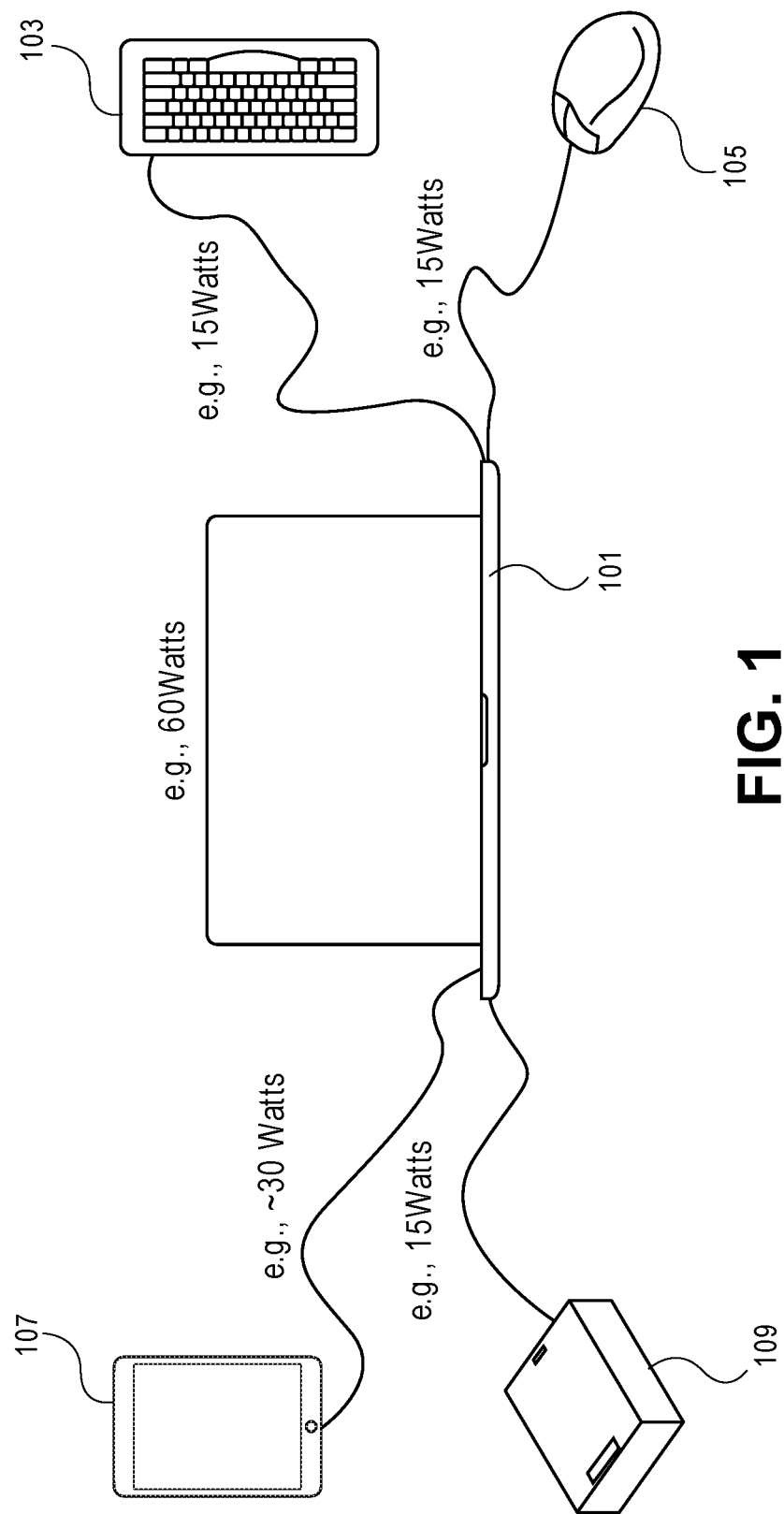
FIG. 1 is a diagram of an example use case where a computer laptop is connected to a set of devices via USB connections.

The embodiments provide a set of processes and mechanisms that improve the functionality of Universal Serial Bus (USB) connection and, in particular, USB Type-C connectors. The embodiments provide a system/platform design capable of improving power management where some of the USB devices connected to a system do not support USB power delivery (USB PD) protocol and therefore do not negotiate power requirements with the host system. The embodiments provide a process and system that improves power allotment amongst devices connected to a host system serving as a power source via USB. In particular, the process and system improves the allotment of power to devices that do not support the USB PD protocol for negotiating power usage via USB.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

As used herein, the phrase Universal Serial Bus (USB) generally refers to a specification(s) for a serial bus that supports the transmission and reception of data (e.g., and power and/or control) between a downstream facing port (e.g., a host) and one or more upstream facing ports (e.g., devices), for example, through one or more hubs there between. In one example, the USB protocol and architecture is defined by the USB 3.1 Specification, Rev. 1.0, released Jul. 26, 2013 and with engineering change notices through Feb. 15, 2017. The USB Power Delivery (USB PD) may be defined by the USB Power Delivery Specification, Rev. 3.0, Version 1.1, released Jan. 12, 2017.

The embodiments provide a system or platform design that is capable of supporting multiple USB Type-C connectors. Further, the embodiments can employ multiple USB host controllers to improve overall system capabilities related to USB and more specifically to USB Type-C subsystems. When two devices are connected to each other via USB ports, there is a communication to determine the power and data transfer to be handled via the USB connection. USB was initially designed as a mechanism for data transfer. However, over time it has evolved to support power delivery. In some cases, the primary use of a USB port is for power delivery. An example of this is with mobile devices such as smart phones and tablets. These devices often utilize USB ports to charge their batters where the wall charger utilizes a USB connector to deliver power to the device.

In some cases, USB can be used to deliver both power and data to multiple devices via a set of USB ports provided by a host or power source. The host or source may only have a fixed amount of power that it can supply to the set of connected devices and it must allot and manage that power to these devices. Prior versions of USB provided a limited range of power supply options with only low current and low power connections offered to any connected device (e.g., 500 mA at 5 v for 2.5 Watts of power). Newer versions of the USB protocols have increased the amount of power that can be provided to any given device (e.g., USB Type-C has allowed for up to 100 watts of power to be supplied). However, this increases the need for careful management of the power allotment.

FIG. 1 is a diagram of an example use case where a computer laptop is connected to a set of devices via USB connections. As used herein, a 'set' refers to any positive whole number of items including one item. In the illustrated example a laptop 101 is connected to a set of devices 103-109 each with different power requirements.

In a first scenario, the laptop 101 is a multiport device a 60 W power source capability. The laptop 101 may advertise a power capability on each port (e.g., by presenting a resistance Rp of 10 k ohms, as part of a process discussed in further detail with relation to FIG. 3) on each port which guarantees 15 W/port (5V/3 A). When a USB-C device without USB-PD support connects to any of these ports a device policy manager (DPM) at the laptop 101 will allocate 15 W from the power pool. This is applicable for low power devices like a keyboard 103 and mouse 105, which do not need 15 W of power. Thus, with the keyboard 103 and mouse 105 connected as illustrated, the laptop 101 will be left with 30 W for the other two ports. When high power consumption device like a tablet 107 or a hard disk 109 is connected the laptop's reserve power pool is insufficient to run both of these devices which would require an additional 45 W, but only 30 W would be available. There is no way that a DPM of the laptop 101 is aware of the power need of USB-C devices connected where there is no USB PD communication. Thus, ports that can operate with less power prevents that power from reaching the ports that need the power, thus limiting system performance. In this example, if the keyboard 103 and mouse 105 were given 5 W each, which is closer to their actual power requirements, then the laptop 101 would have sufficient power for the tablet 107 and hard disk 109.

Another problem that arises from the connection of devices that do not support USB PD, is that the DPM is unable to provide devices more power above a default where those devices may be able to utilize the extra power. Using the example of FIG. 3, the laptop 101 may advertise a source voltage Vss of 4.5 W or 5 v at 900 mA (e.g., by presenting an RP of 56$k$ ohms), which is a default USB requirement. If the tablet 107 is connected and does not support USB PD then it will only take the 4.5 W and take a longer time to charge, when the laptop 101 could provide more power and charge the tablet 107 faster, but the opportunity for improved charging is missed. Devices like mobile devices and tablets can operate in the 5 v range and do not need to implement USB PD. These devices rely on the Rp current advertisement of devices like the laptop 101 to determine what current to draw from the devices.

Thus, the example of FIG. 1 illustrates the issues present in a multiport environment where the host and the DPM managing the ports power allotment lack the information to best utilize the power resources of the system. This lack of information limits the system's ability to optimize power allotment when there are devices that are connected that do not support USB PD.

Figure 2:
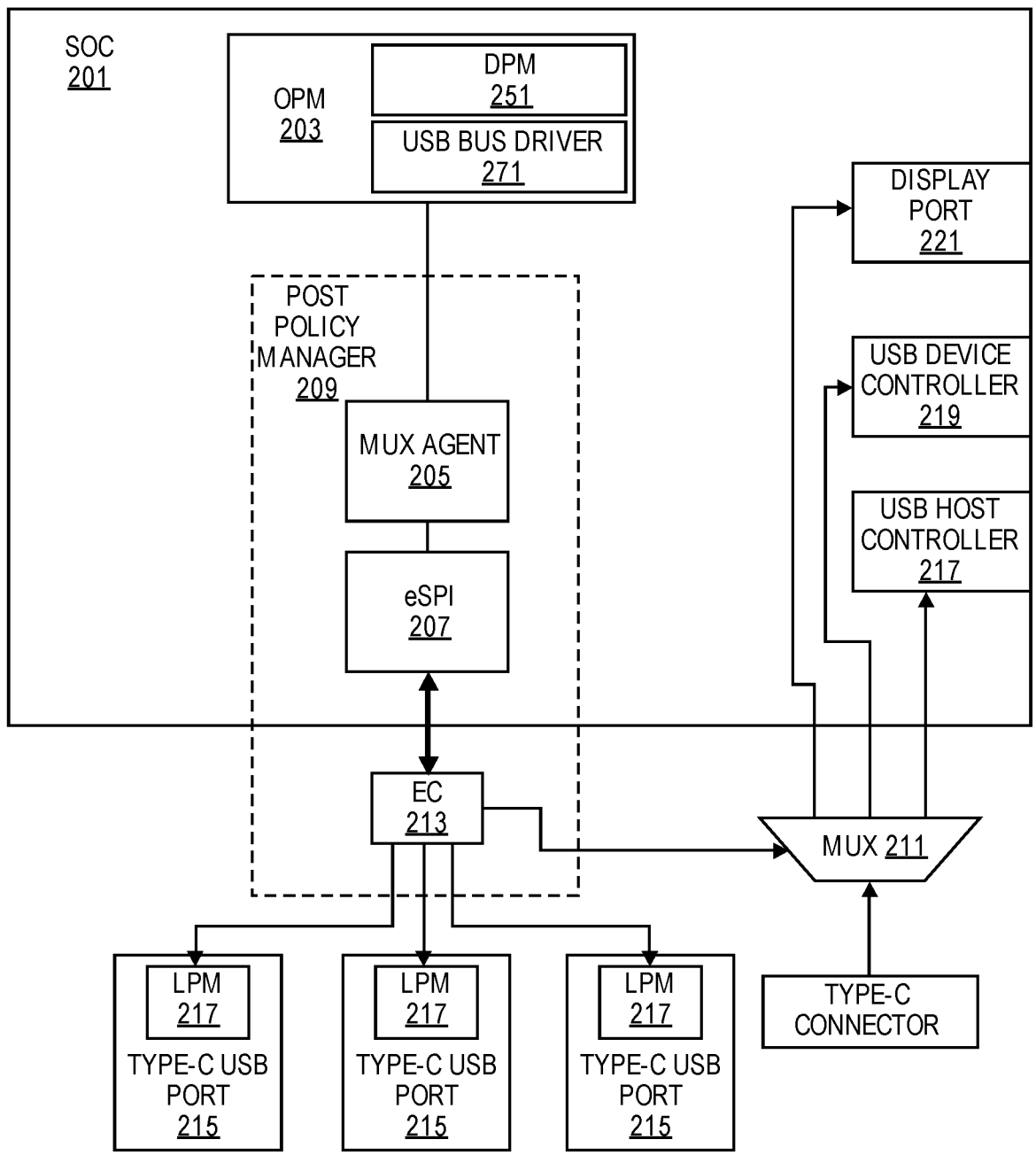
FIG. 2 is a diagram of one embodiment of a computing system with an architecture with connection detection components on the motherboard.

FIG. 2 is a diagram of one embodiment of a computing system with an architecture with connection detection components on the motherboard. The computing system is illustrated with abstraction to show those components relevant to the processes for handling USB Type-C connections and in particular those components that are relevant for determining power management for the connected devices including those that support the USB Type-C power deliver (USB PD) and those that do not support USB PD.

The example system includes a system on a chip (SOC) 201 that includes a processor or set of processors and internal interconnects that are illustrated in further embodiments below with regard to FIGS. 7 and 8, which illustrate and describe the hardware components of SOCs. In other embodiments, the system may not be structured as a SOC and may instead have separate processor and chipset components. One skilled in the art would understand that the principles, structures and processes described herein with relation to a SOC architecture, which is provided by way of example and not limitation, would also apply to other computer architectures.

The processors of the SOC execute an operating system (OS) policy manager (OPM) 203 that communicates OS based requests to the USB Type-C connector/device and receives the same. The OPM 203 is in communication with the platform policy manager (PPM) 209, which manages USB Type-C ports of the computer system and applies system and power delivery policies. The OPM 203 can include a device power manager (DPM) that specifically manages the power allotment to connected devices in coordination with other components including the PPM and the link policy managers (LPMs) 217. The OPM 203 also includes a USB bus driver 271 that manages the enumeration of USB devices and other functions of USB communication. The USB bus driver 271 can include a DPM extension 273 that provides USB device configuration descriptor information to the DPM. In other embodiments, a user space DPM daemon may interact with the USB bus driver 271 to provide this information to the DPM.

The PPM 109 includes a multiplexor (mux) agent 205 that manages the communication with a discrete external multiplexor 211 to enable a display port 221, USB device controller 219 and USB host controller 217 to communicate with a set of Type-C USB ports 215 via an embedded controller (EC) 213. The computing system in which a set of Type-C ports or connectors 215 are present may include any number of such ports or connectors. However, in some embodiments, an EC can only connect with four connectors, where there are four or more connectors, the external multiplexor 211 is utilized. In further embodiments, other mechanisms such as an infrastructure engine may manage communication and routing of communication with the USB ports.

The PPM includes an enhance serial peripheral interconnect (eSPI) that manages port status communication messages between the ports or connectors 215 and the PPM 209. Each of the ports may implement a LPM 217 that manages status information at the port that can be retrieved by the EC. The mux agent 205 communicates via eSPI with the external multiplexor 211.

The display port 221 is a component for managing communication with an external monitor that may be connected to a given Type-C port or connector 215. A USB device controller 219 and USB host controller 217 manage general USB compliant communication where the computing system functions as a device or host, respectively. Each of these functions must be supported for each Type-C connector or port.

Figure 3:
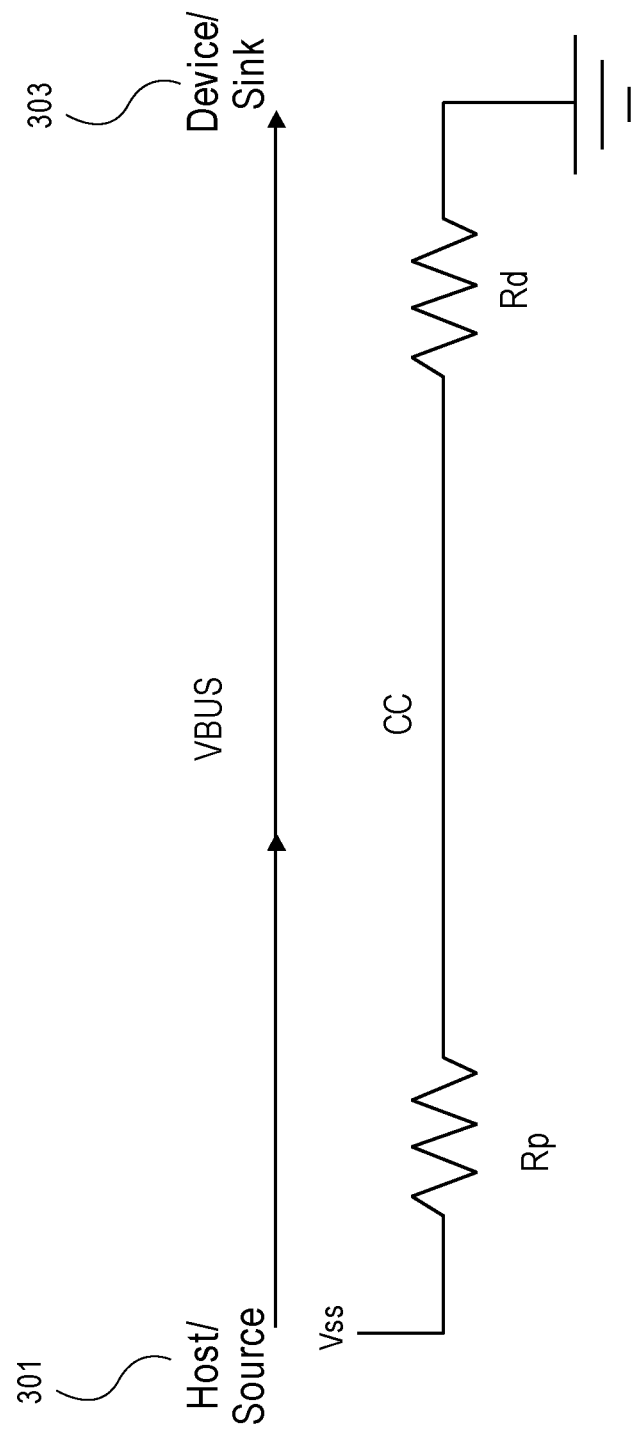
FIG. 3 is a diagram of one example embodiment for the electrical connection between a USB host or power source and a USB device or power sink.

FIG. 3 is a diagram of one example embodiment for the electrical connection between a USB host or power source and a USB device or power sink. As discussed above, the USB port was originally designed primarily for data transfer and has evolved now to add power delivery capability of up to 100 Watts. This new capability of a USB port is defined through specification USB Type-C (USB-C) Cable and Connector Specification 1.2 and USB Power Deliver Specification 3.0 and later versions of these documents. These specifications define a protocol and structures for devices which are Dual Role Power (DRP), which can be either a power source or a power sink (i.e., a consumer of power) and at the same time these devices have a Dual Role Data (DRD), which means that any device can act as host and device.

A configuration process is defined by these specifications that used to determine connection and orientation detection, initial power role, and initial data role. This configuration process is carried out over a Configuration Channel (CC) signal line. The action of an attach or detach of a device from a USB-C port is determined by a specified resistance to ground on the CC line. Over the CC line a device acting as a power source presents a resistance Rp and a device that is acting as a power sink presents a resistance Rd to start the configuration process as shown in the FIG. 3.

A computing device acting as a USB power source can present three different resistance Rp on the CC line to advertise current levels that are supported. The computing device acting as a power sink uses difference on the CC line to determine the current it could draw from the power source. Thus, the computing device acting as power sink that is configured to take advantage of the different power options advertised by the power source is aware of dynamic changes of Rp by the source. The three different current levels supported and the Rp resistances of a power source is illustrated in the Table I below:

TABLE I

| Source Advertisement | Resistor Pullup to 4.75-5.5 V | Resistor Pullup 3.3 V +/− 5% |
|---|---|---|
| 900 mA@5 V | 56k ohms | 36k ohms |
| 1.5 A@5 V | 22k ohms | 12k ohms |
| 3 A@5 V | 10k ohms | 4.7k ohms |

To negotiate for higher power of up to 100 W (20V/5 A), a protocol negotiation defined by the USB PD specification is used. In a multiport device with a combination of USB PD and non-USB PD ports, the power policy of all the USB ports is managed by a centralized Device Policy Manager (DPM) of the USB PD module.

Figure 4:
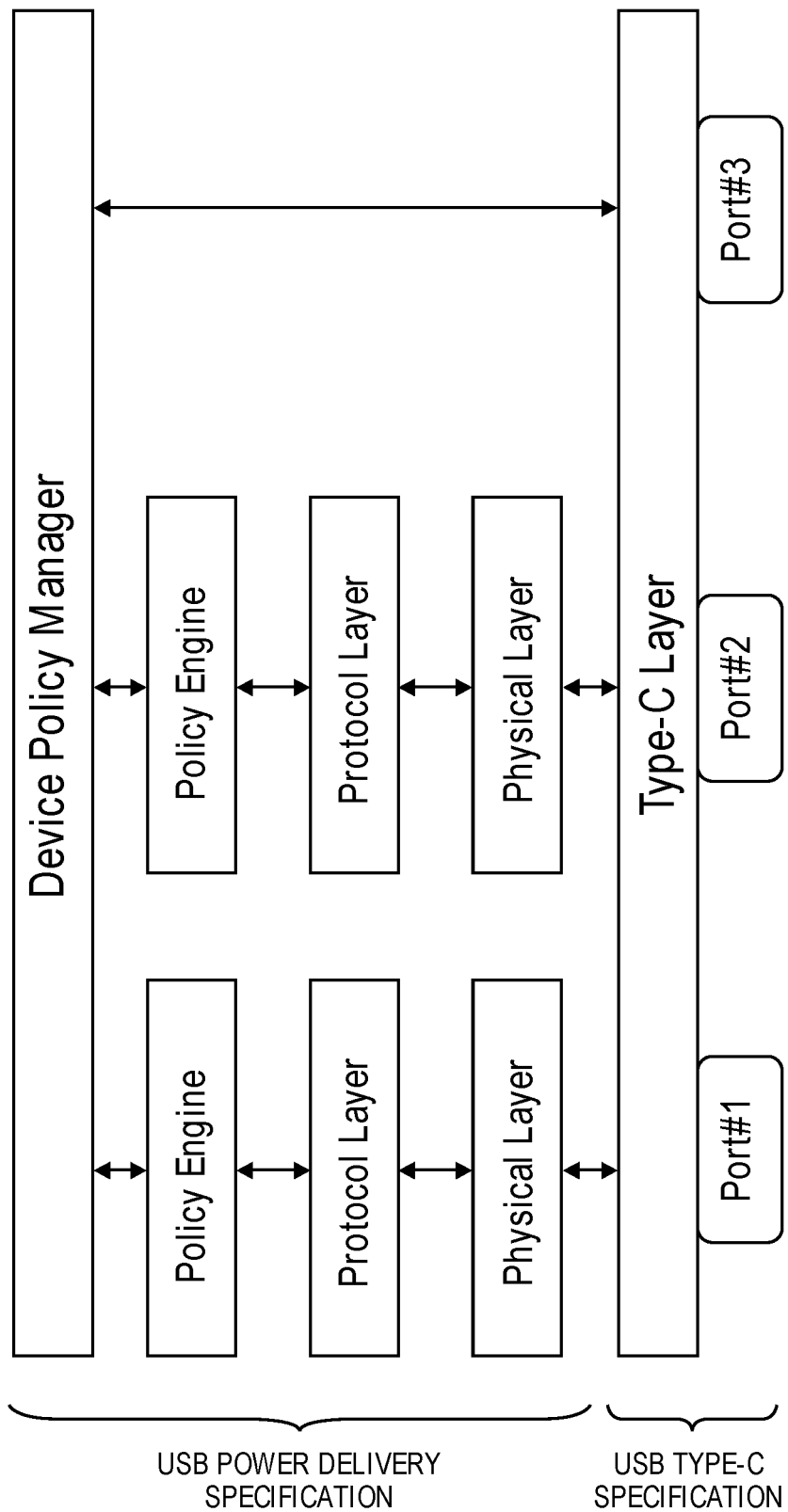
FIG. 4 is a diagram of one example representation of the different layers of a multiport USB-C/USB PD source device.

FIG. 4 is a diagram of one example representation of the different layers of a multiport USB-C/USB PD source device. In the example, the multiport device has three port, with two ports (#1, #2) connecting with USB PD devices and port #3 connected with a USB Type-C (USB-C) device with no USB PD support. For port #3 the Device Policy Manager (DPM) manages the device power requirement with no additional information about the power requirements and capabilities of the device connected to port #3. In this example, the DPM is left with no information about the device on port #3 and will have to leave the default advertisement of Rp presented on the CC line. This would lead to the use and allotment of the default power settings for the device on port #3, which may be an over-allotment of power or may result in the device receiving less power than it could optimally utilize.

The DPM communicates with the ports through the layers of the USB type-C specification for all of the ports. For ports #1 and #2, which support USB-PD, the DPM also communicates via these layers as well. The USB-PD specification defines a policy engine, protocol layer and physical layer. The physical layer encompasses the physical medium of communication between the port and the DPM as well as low level communication related to power deliver such as the configuration of resistance levels (e.g., Rp and Rd) on the physical medium. The protocol layer defines messaging between the port and the DPM that enables the DPM to negotiate allotted power levels for the devices attached to the port. The policy engine implements basic USB-PD management specific to the corresponding port. The DPM controls the allotment and management of power across the available ports in the system.

The embodiments provide an enhancement to the operation of the DPM to improve the power allotment and optimize overall system power management efficiency. The embodiments operate by obtaining additional information about connected devices about their power requirements when the devices do not support USB PD including when the devices are USB-C devices. Power requirements are extracted from various descriptors available via USB-C and advanced configuration and power interface (ACPI). USB and ACPI enumerate the USB connectors and ports in a system at start-up and generate descriptors for each of the USB connectors and ports as well as for the devices coupled to the USB ports (i.e., the USB endpoints). This information is utilized to set an Rp value that is advertised to non-USB PD devices that is based on the device's power needs determined from the expanded information provided by the descriptors.

The embodiments thereby improve the operation of the DPM in scenarios where low power devices are connected and where high power charging devices are connected. The embodiments provide a DPM that can allot 4.5 Watts to low power devices instead of the standard 15 W (5 v/3 A), thereby saving 10.5 Watts of power per low power device. Similarly, the embodiments can enable the DPM to increase the current provided to high power requirement battery operated deices above a standard 5 v/900 mA which would require 4.5 hours to charge a 3500 mAh battery. The embodiments can cut the time to charge a 3500 mAh battery by 3 hours to 1.5 hours of charge time for the 3500 mAh battery.

In a USB-C ecosystem, the connection and enumeration of a USB device is divided between the USB Type-C/USB PD subsystems and the USB functional subsystem. The USB Type-C subsystem is responsible for connect/disconnect and managing power. After successful connection and power negotiation the functional aspects of USB like enumeration and USB device functionality (e.g., data transfer) is started. In the current USB Type-C/USB PD ecosystems there is no definite feedback path from the USB functional subsystem back to the USB Type-C/USB PD subsystem. Thus, the USB Type-C and USB PD subsystems do not rely on or make use of the data determined during device enumeration.

When a DPM starts up in a system it presents an Rp value that is a higher or lower current advertisement. At this point of advertisement there is no logical mechanism and insufficient information to decide upon an Rp value that is best suited for a particular USB device connected to the system. This lack of knowledge prevents the DPM from properly managing the available power in the system for USB devices, in particular for devices that are USB Type-C only devices. As per the USB specification, the power requirements of a USB device are shared in the system as part of a set of descriptors and are made available during the enumeration process. The USB configuration descriptor is a data structure created by the USB subsystem during enumeration and the USB configuration descriptor holds information as shown below in Table II.

TABLE II

| Offset | Field | Size | Value | Description |
|---|---|---|---|---|
| 0 | bLength | 1 | Number | Size of Descriptor in Bytes |
| 1 | bDescriptorType | 1 | Constant | Configuration Descriptor (0x02) |
| 2 | WTotalLength | 2 | Number | Total length in bytes of data returned |
| 4 | bNumInterfaces | 1 | Number | Number of Interfaces |
| 5 | bConfigurationValue | 1 | Number | Value to use as an argument to select this configuration |
| 6 | iConfiguration | 1 | Index | Index of String Descriptor describing this configuration |

TABLE II-continued

| Offset | Field | Size | Value | Description |
|---|---|---|---|---|
| 7 | bmAttributes | 1 | Bitmap | D7 Reserved, set to 1. (USB 1.0 Bus Powered) D6 Self Powered D5 Remote Wakeup D4.0 Reserved, set to 0. |
| 8 | bMaxPower | 1 | mA | Maximum Power Consumption in 2 mA units |

The bMaxPower field indicates the maximum power consumption of the device from the USB port when fully operational. The value can be expressed in 8 mA units when operating at a Gen X speed. The device configuration reports also whether the device is bus powered or self-powered. If a device is disconnected from its external power source it may update its device status to indicate it is no longer self-powered. A device may not increase its power draw beyond the amount reported by its configuration.

The embodiments extract this information collected from the USB configuration descriptor during the USB enumeration and provides the details as feedback to the Device Policy Manager (DPM). A DPM extension block that is part USB bus driver or a user space DPM daemon managing USB parses the USB configuration descriptors to retrieve the power requirements of each USB device. In a USB bus driver model, the USB enumeration process of the USB bus driver or the DMP extension block sends Get Descriptor commands to collect the descriptor. During the enumeration process the USB configuration descriptors are parsed and the DPM extension integrated along with the USB bus driver sends the power details to the DPM managing the USB-C port. In a user space program/daemon model the DPM is extended as user daemon which parses the USB descriptor information from the system files created by the bus driver to the user space. This parsed information is then passed on by DPM daemon to the DPM managing the USB-C port. This information may be passed to an USB PD controller which is outside the SoC via a wire or passed on via a parallel software module in a SoC solution where the USB PD is integrated within the SoC.

Figure 5:
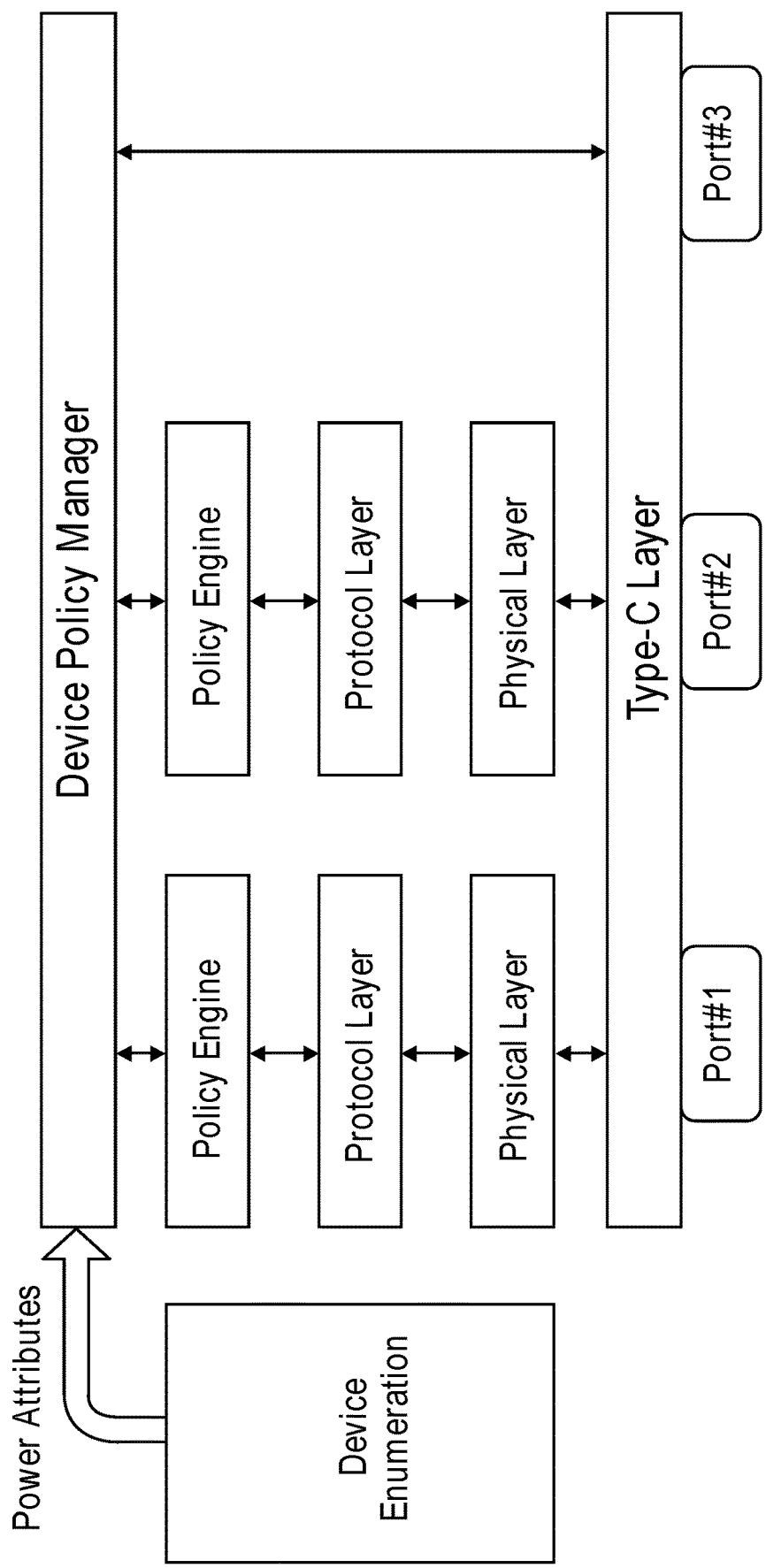
FIG. 5 is a diagram of one embodiment of the feedback path to provide the extracted maximum power information to the DPM.

FIG. 5 is a diagram of one embodiment of the feedback path to provide the extracted maximum power information to the DPM. The feedback path forwards the power attribute data from the USB configuration descriptor generated by the USB enumeration process to the DPM. The device enumeration process is part of the USB subsystem and separate from the USB Type-C and USB PD subsystem. In some embodiments, the device enumeration module in the USB subsystem that enumerates USB device also extracts and forwards the information to the DPM. In other embodiments, a separate function that is not part of the USB subsystem extracts the information when prompted by the DPM to extract and return the information to the DPM. In further embodiment, the DPM accesses the descriptor from the USB subsystem.

Figure 6:
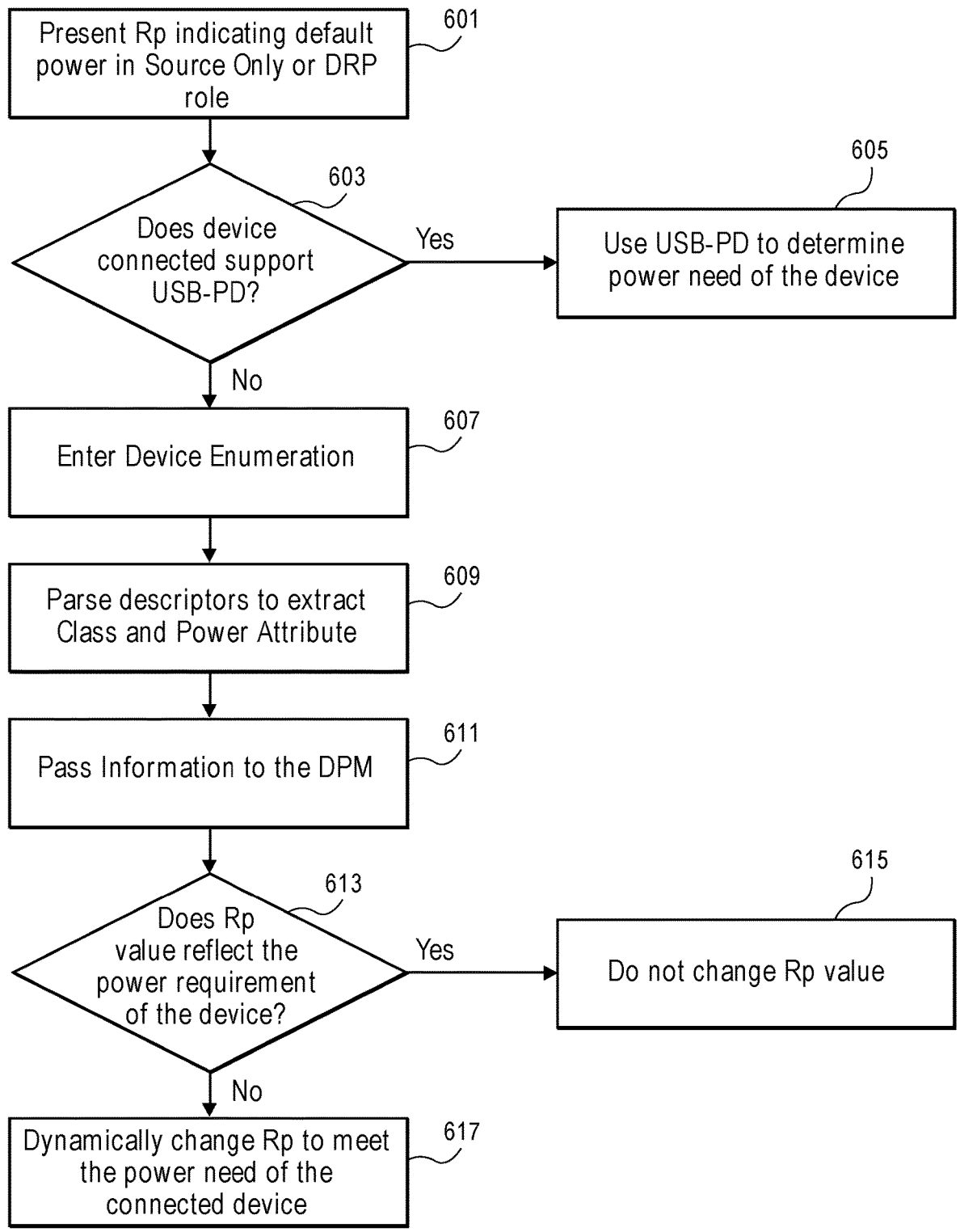
FIG. 6 is one embodiment of a flowchart for the process of power management with the enhanced DPM.

FIG. 6 is one embodiment of a flowchart for the process of power management with the enhanced DPM. The process is one embodiment of how to manage an Rp value that is advertised by the DPM when operating in source mode and how to dynamically change the Rp value based on the current need of a device. The process is described with relation to managing power to a single USB port. However, one skilled in the art would appreciate that the process can be applied to any number of USB ports. The management across the ports can also take into consideration the available power from the power source, such that the DPM does not allot more power than is available from the power source.

In one embodiment, the process is initiated by presenting or advertising the lower power Rp(5V/900 mA) as part of the connection process with a given USB port (Block 601). This allows the DPM to allocate a minimum amount power from the resource power pool. The DPM then determines whether the connecting USB device supports USB PD negotiation (Block 603). The determination of USB PD support can be accomplished via protocols defined by the USB PD specification, if the connecting USB device fails to respond, then the device can be categorized as being a non-USB PD device. If USB PD is supported by the connecting USB device, then the power requirements for that connecting USB device are negotiated using the USB PD protocol and the value of Rp is insignificant in that process (Block 605).

If the device does not support USB PD, in particular if the device is a USB Type-C only device with no support of USB PD, then the process completes the USB device enumeration process (Block 607). In this case the DPM may idle or explicitly signal the USB functional subsystem to perform enumeration of the USB device. This is carried out in the USB Functional subsystem outside the USB Type-C process and hence this information needs to be propagated back to the USB Type-C subsystem to be utilized by the DPM. The communication from the USB Functional subsystem to the USB Type-C subsystem could be via internal wired interface or via software inter-process communication (IPC). In either case, the USB functional subsystem may be modified to receive a signal or message to enter device enumeration from the DPM or other helper function. Similarly, the USB functional subsystem or a helper function may return the information generated from the enumeration process, specifically the maximum power value from the USB configuration descriptor. The modified USB functional subsystem or helper function parse the generated USB configuration descriptor to obtain the maximum power requirements values or similar power attributes of the connecting USB device (Block 609). This information can then be returned to the DPM (Block 611).

On receiving the information, the DPM shall evaluate with the current value of Rp presented to the connecting USB device (Block 613). The DPM shall change the value of Rp if the two power requirements do not match each other (Block 617). The DPM can change the value of Rp to match the maximum power level of the connecting USB device or the closest available power level that the power source pool may allow. The DPM may also have policies that otherwise limit the upper bound of allotted power. If the power attributes indicate that the connecting device has power requirements that match the current Rp value, then the Rp value is not changed. For example, the connecting device is a low power device and only requires the minimum power allotment that the default Rp advertisement correlates with.

The embodiments of the system include systems where the operating system aspects are executed by a central processing unit (CPU). The CPU can be part of a system on a chip (SOC) that includes a processor or set of processors and internal interconnects that are illustrated in further embodiments below with regard to FIGS. 7 and 8, which illustrate and describe the hardware components of SOCs. In other embodiments, the system can have a set of processors that are connected via an I/O chipset with the USB infrastructure and BIOS. A 'set,' as used herein refers to any positive whole number of items including one item.

As mentioned above, with regard to FIGS. 1, 3 and 5, the computing system is illustrated with abstraction to show those components relevant to the processes for the configuration of USB host and connector mapping.

In certain embodiments, a first device may connect to a second device through a (e.g., wired) electrical connection, for example, a serial bus cable having multiple conductors (e.g., wires). A cable may include a plug, e.g., on each end thereof. A receptacle of a device (or a plug of a device) may receive a plug (or receptacle) coupled to another device. In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position.

Certain embodiments (for example, with one or more flip-able plug and receptacle pairs) may allow a first device and/or a second device to toggle between different roles, for example, as the devices wait for a physical connection to be made and each device's role to be established, e.g., in contrast to a connector's type defining a role, such as a type-A USB connector being a host (data master) role and a type-B USB connector being a slave (data recipient) role. In certain embodiments herein, a first device may be in a first role (e.g., an upstream facing data port role, downstream facing data port role, power source role, and/or power sink role) and a second device in a second (e.g., same or different than the first) role (e.g., an upstream facing data port role, downstream facing data port role, power source role, and/or power sink role). In one embodiment, a device (e.g., a circuit thereof) presents itself (e.g., during initial attachment) as a first of a plurality of roles, then changes to a second of a plurality of roles, etc. In one embodiment, a device (e.g., a circuit thereof) presents itself (e.g., during initial attachment) as a first role, then toggles to a second role, then back to the first role, for example, and continues to do so, e.g., until the other device acknowledges that role (e.g., via an acknowledgement signal). For example, a current USB Type-C specification (e.g., revision 1.2 of Mar. 25, 2016) and a current USB Power Delivery specification (e.g., revision 3.0, version 1.0a of Aug. 2, 2016) includes an upstream facing data port role (e.g., a host) and a downstream facing data port role for each device (e.g., a USB device) and/or a power source role and a power sink role. In one embodiment, a device in the power source role (e.g., that acquires the power source role) is also in the downstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles). In one embodiment, a device in the power sink role (e.g., that acquires the power sink role) is also in the upstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles).

In certain embodiments, a first device with multiple (e.g., dual) roles may connect to a second device with multiple (e.g., dual) roles (for example, where each device's role is not defined by the connector (e.g., a plug or receptacle thereof) type, e.g., two devices connected by a cable that has the same plug at each end). In embodiments, each device may present itself in the same role, for example, where the devices do not connect to each other, e.g., do not connect from a user's perspective or with respect to a communication protocol (for example, electrically and/or physically connected devices that do not allow data and/or power transmission or reception, e.g., other than communications to define a device's role). Certain devices (e.g., operating according to specification(s) or industry standards) do not have predefined roles, for example, each device is to establish its role, for example, or it does not function, e.g., to transmit and receive data and/or source and sink power. Certain devices (e.g., operating according to specification(s) or industry standards) do not define device role(s), for example, in the point-to-point connection by the connector type, e.g., to accept and provide power and/or data with an externally connected device (e.g., a laptop connected to phone, a laptop connected to an external (e.g., USB drive), a phone connected to tablet, etc.).

For example, each device of a plurality of devices may include a same connector (e.g., plug or receptacle thereof), for example, such that circuitry is to cause signaling (e.g., between connected devices) while the connections are physically made (e.g., during an initialization phase) in order to define the role(s) of each device, for example, one device as a host and another device as a slave and/or one device as a power source (e.g., provider) and another device as the power sink (e.g., consumer). In certain embodiments, devices that toggle (e.g., switch) between either of a plurality of roles (e.g., a dual role device) are to toggle (e.g., via a toggling circuit) back and forth between a plurality of roles, for example, (e.g., only) between an upstream facing data port role (e.g., slave or device role) and a downstream facing data port role (e.g., host role). Device(s) may toggle between a plurality of roles until a specific (e.g., stable) state is established, for example, during a connection process (e.g., initial attach). A multiple (e.g., dual) role device may connect to a fixed role device or another multiple (e.g., dual) role device. In one embodiment, both devices are capable of the same (e.g., pair of) roles. In one embodiment, both multiple (e.g., dual) role devices (e.g., the ports thereof) are toggling between a first role and a second role (for example, via one or more of each device's configuration channels (e.g., each device's CC1 and CC2 pins)) at (e.g., substantially) the same frequency (e.g., time rate) and/or duty cycle. Thus, in certain embodiments, a physical connection is made (e.g., with a USB Type-C cable) between two or more multiple role devices but none of the devices detects the signaling to define a role (e.g., no device detects a signaling event or sends a response to acknowledge the signaling event).

Certain embodiments herein provide for a randomization of one or both of multiple role device's toggling frequency and its toggling duty cycle, for example, to minimize the probability of in sync toggling. Certain embodiments herein provide for a randomization of one or both of multiple role device's toggling frequency and its duty cycle during each cycle of toggling between different device roles. Certain embodiments herein randomize a multiple (e.g., dual) role device's toggling frequency and duty cycle, e.g., to vary the high and low times of the toggling, to reduce or eliminate the possibility of two (e.g., unique) separate devices having the same timings, e.g., over a plurality of cycles. Certain embodiments herein provide for one or more multiple (e.g., dual) role devices connected together to resolve their upstream facing data port role and downstream facing data port role and/or their power source role and power sink role faster than without randomization, e.g., as the likelihood all (e.g., both) devices are asserting (e.g., displaying) the same role at the same time is reduced (e.g., lower) or eliminated. Certain embodiments herein add more randomization to the toggling frequency and/or duty cycle of a device asserting each role indicator than a device with a fixed duty cycle and/or frequency of toggling, e.g., more randomization than a substantially fixed toggling duty cycle and/or a substantially fixed frequency of toggling that rely only on the inaccuracy (e.g., according to manufacturing tolerances) of internal timers or oscillators to provide variance (e.g., misalignment) to resolve roles and avoid the case where the toggling is in sync. Certain embodiments herein reduce role resolution times as well as reduce or avoid any occurrences where neither device sees the role defining event (e.g., a cable and/or plug insertion event). Certain embodiments herein reduce (e.g., to the end user) the resolution time significantly, e.g., the overall time from connection of the devices to usability (e.g., to allow payload data to be transmitted and received, e.g., and not role merely role resolution data transmission and receipt) is shorter.

Figure 7:
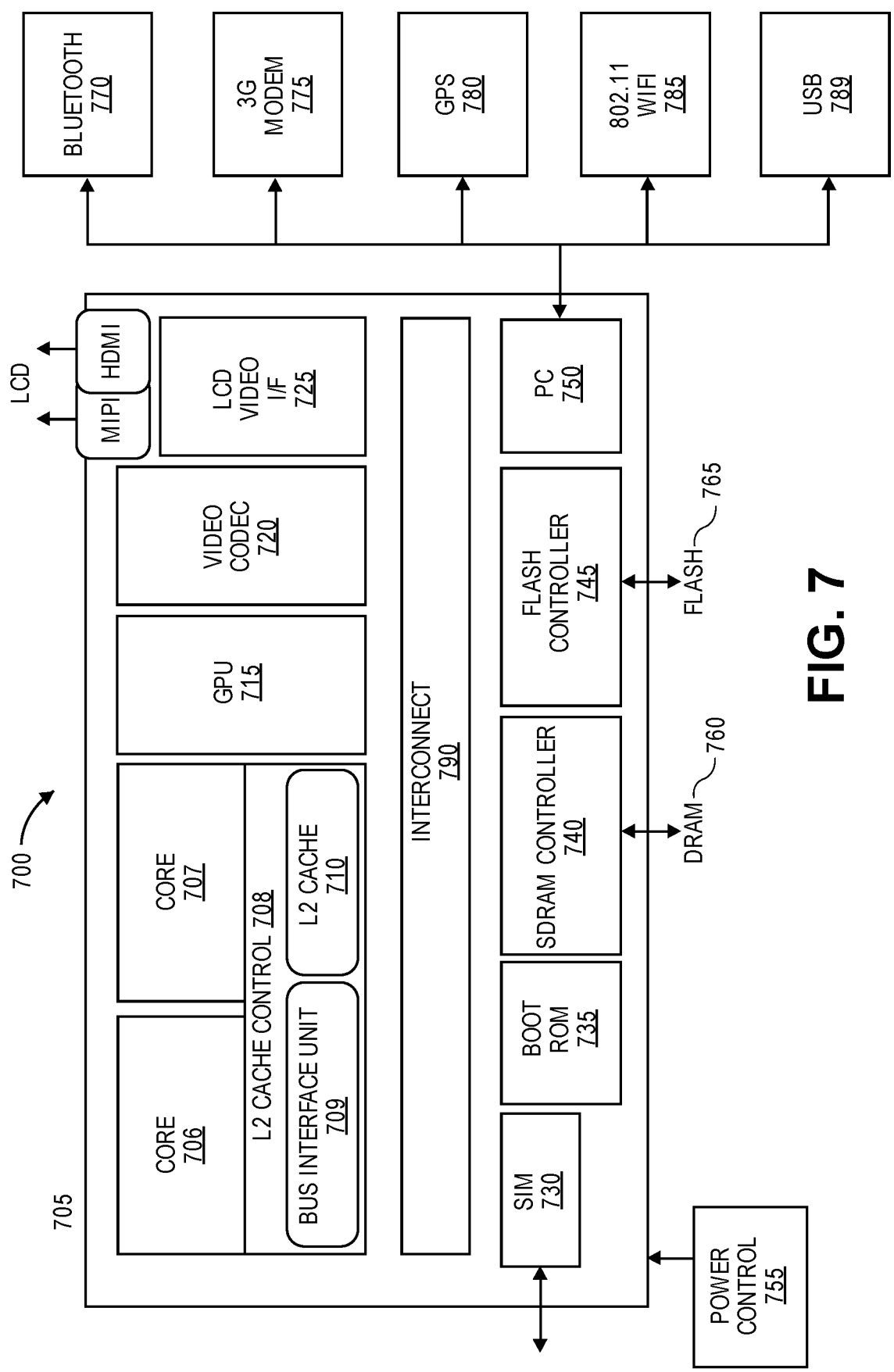
FIG. 7 is a diagram of one embodiment of a system on a chip (SOC) that may implement aspects of the embodiments.

FIG. 7 is a diagram of one embodiment of a system on-chip (SOC) design that may be utilized to implement the embodiments. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores-706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 790 includes an on-chip interconnect, such as an IOSF, AMBA, or other interconnect discussed above, which potentially implements one or more aspects of the described embodiments.

Interconnect 790 provides communication channels to the other components, such as a Subscriber Identity Module (SIM) 730 to interface with a SIM card, a boot ROM 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the embodiments described herein.

In addition, the system illustrates peripherals for communication, such as a Bluetooth module 770, 3G modem 775, GPS 780, WiFi 785 and USB 787. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the FIGS. 7-12 provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 8:
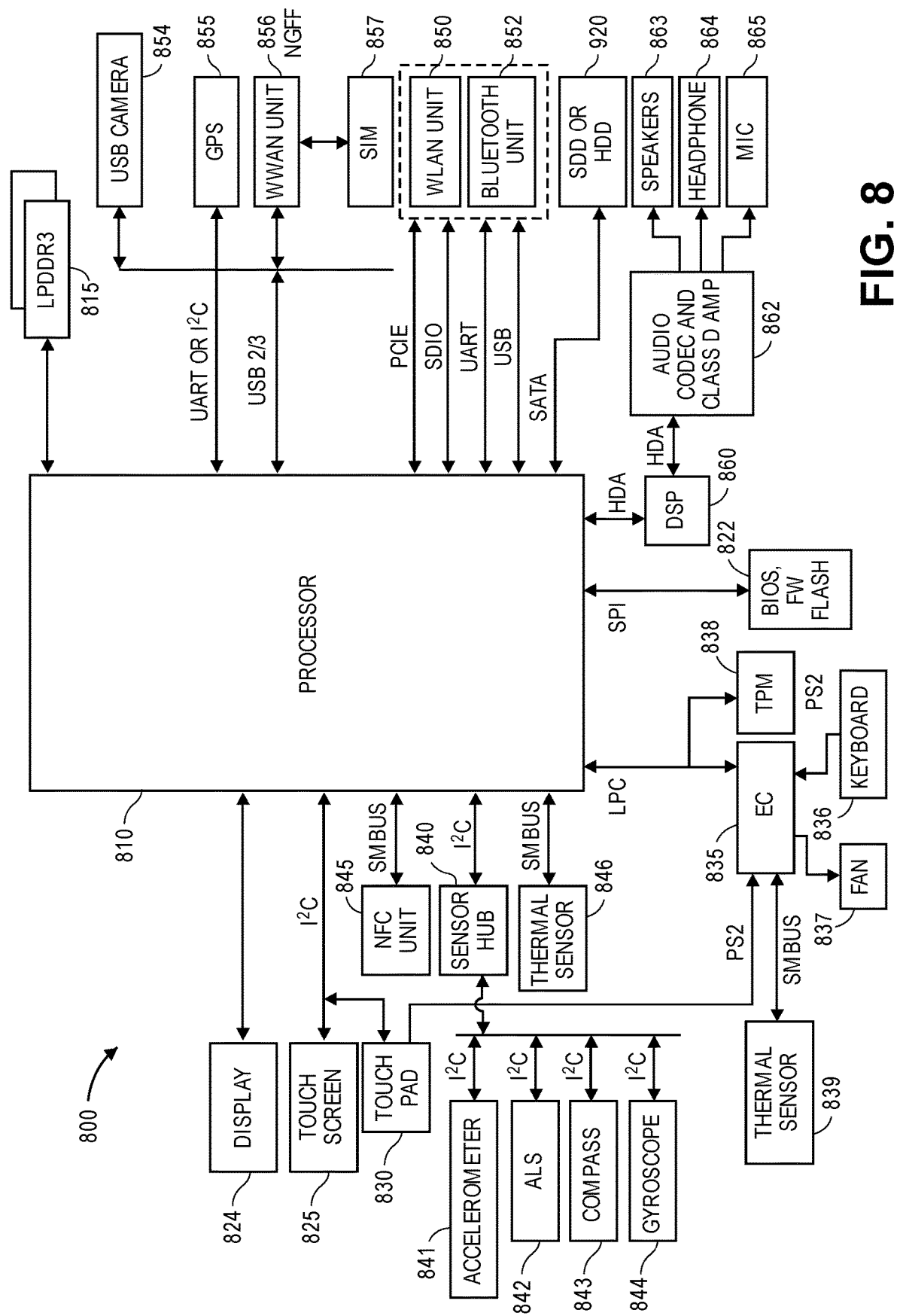
FIG. 8 is a diagram of computing system including the SOC and components that implemented the embodiments.

FIG. 8 a block diagram of components present in a computer system as an example implementation of the components of the embodiments. As shown in FIG. 8, system 800 includes any combination of components. These components may be implemented as integrated circuits (ICs), portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high-level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 8, a processor 810, in one embodiment, includes a microprocessor, multi-core processor, multi-threaded processor, an ultra-low voltage processor, an embedded processor, or other known processing element. In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC TESD 209-2E (published April 2011), or a next generation LPDDR standard to be referred to as LPDDR3 or LPDDR4 that will offer extensions to LPDDR2 to increase bandwidth. In various implementations, the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high-performance graphics interconnect. Touch screen 825 may be coupled to processor 810 via another interconnect, which in an embodiment can be an $I^2C$ interconnect. As further shown in FIG. 8, in addition to touch screen 825, user input by way of touch can also occur via a touch pad 830 which may be configured within the chassis and may also be coupled to the same $I^2C$ interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode, the system is folded shut such that the back-display surface of the display panel comes to rest in a position such that it faces outwardly towards a user, when the bottom surface of the base panel is rested on a surface or held by the user. In the tablet mode of operation, the back-display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments, the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also, the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I²C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can support 3 power states, namely screen on (normal); Connected Standby (as a default "off" state); and shutdown (zero watts of power consumption). Thus, in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also, seen in FIG. 8, various peripheral devices may couple to processor 810 via a low pin count (LPC) interconnect. In the embodiment shown, various components can be coupled through an embedded controller (EC) 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express™ Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol, e.g., USB 2.0 or 3.0 link, or a UART or I²C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 835. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic,) the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Figures 9, 10:
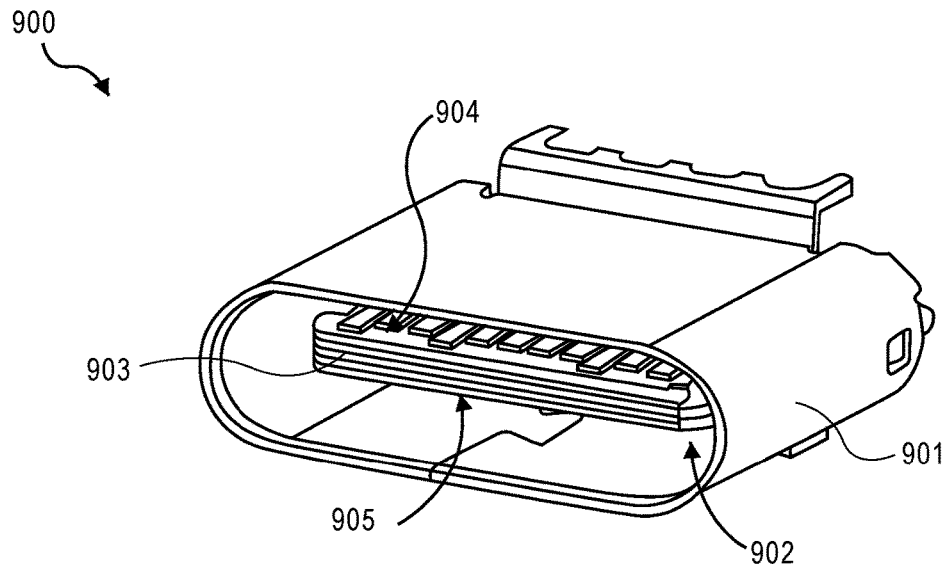
FIG. 9 illustrates a perspective view of a serial bus receptacle.
FIG. 10 illustrates a schematic diagram of the pins of a serial bus.
Figure 11:
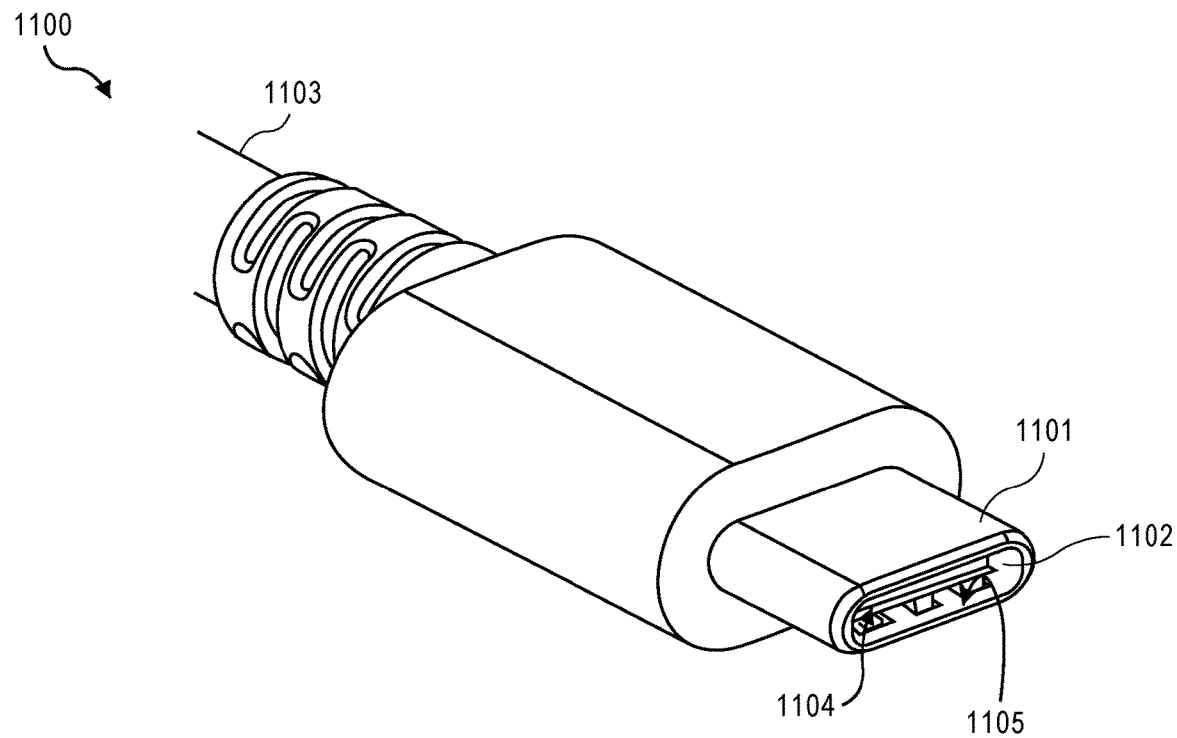
FIG. 11 illustrates a perspective view of a serial bus plug.

FIGS. 9-11 discuss embodiments of receptacles and plugs to connect one device to another device. Table III that follows depicts embodiments of channels (e.g., conductors) to allow signals to flow between multiple devices.

TABLE III

Example Communication Channels

| Pin | Signal Name | Description | Mating Sequence | Pin | Signal Name | Description | Mating Sequence |
|---|---|---|---|---|---|---|---|
| A1 | GND | Ground return | First | B12 | GND | Ground return | First |
| A2 | SSTXp1 | Positive half of first (e.g., SuperSpeed) transmitter (TX) differential pair of a first type | Second | B11 | SSRXp1 | Positive half of first (e.g., SuperSpeed) receiver (RX) differential pair of the first type | Second |
| A3 | SSTXn1 | Negative half of first (e.g., SuperSpeed) TX differential pair of the first type | Second | B10 | SSRXn1 | Negative half of first (e.g., SuperSpeed) RX differential pair of the first type | Second |
| A4 | VBUS | Bus Power | First | B9 | VBUS | Bus Power | First |
| A5 | CC1 | Configuration Channel | Second | B8 | SBU2 | Sideband Use (SBU) | Second |
| A6 | Dp1 | Positive half of a second type (e.g., USB 2.0) of differential pair - Position 1 | Second | B7 | Dn2 | Negative half of the second type (e.g., USB 2.0) of differential pair - Position 2 | Second |
| A7 | Dn1 | Negative half of the second type (e.g., USB 2.0) of differential pair - Position 1 | Second | B6 | Dp2 | Positive half of the second type (e.g., USB 2.0) of differential pair - Position 2 | Second |
| A8 | SBU1 | Sideband Use (SBU) | Second | B5 | CC2 | Configuration Channel | Second |
| A9 | VBUS | Bus Power | First | B4 | VBUS | Bus Power | First |
| A10 | SSRXn2 | Negative half of second (e.g., SuperSpeed) RX differential pair of the first type | Second | B3 | SSTXn2 | Negative half of second (e.g., SuperSpeed) TX differential pair of the first type | Second |
| A11 | SSRXp2 | Positive half of second (e.g., SuperSpeed) RX differential pair of the first type | Second | B2 | SSTXp2 | Positive half of second (e.g., SuperSpeed) TX differential pair of the first type | Second |
| A12 | GND | Ground return | First | B1 | GND | Ground return | First |

FIG. 9 illustrates a perspective view of a serial bus receptacle 900 according to embodiments of the disclosure. In certain embodiments, serial bus receptacle 900 may be part of (e.g., within) a device (e.g., mounted to a circuit board of a device).

FIG. 10 illustrates a schematic diagram 1000 of the pins of a serial bus receptacle (e.g., serial bus receptacle 900) according to embodiments of the disclosure.

FIG. 11 illustrates a perspective view of a serial bus plug 1100 according to embodiments of the disclosure. In certain embodiments, serial bus plug may connect (e.g., physically and electrically) to a serial bus receptacle (e.g., serial bus receptacle 1100).

Figure 12:
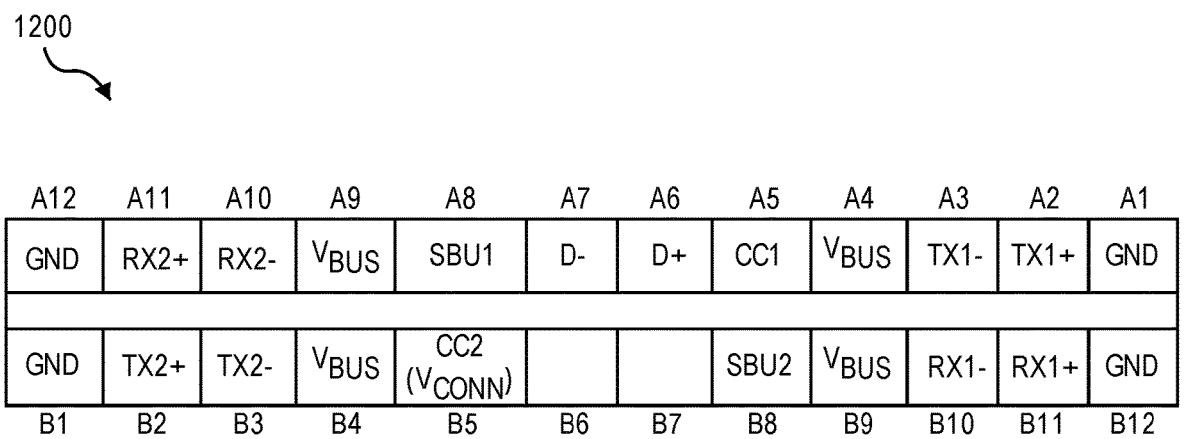
FIG. 12 illustrates a schematic diagram of the pins of a serial bus plug.

FIG. 12 illustrates a schematic diagram 1100 of the pins of a serial bus plug (e.g., serial bus plug 1300) according to embodiments of the disclosure.

In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position. In certain embodiments, a serial bus plug is flip-able between a right-side up position and an upside-down position (relative to the receptacle it is to be inserted into). In certain embodiments, (e.g., serial bus) plug 1100 of FIG. 11 slides within (e.g., serial bus) receptacle 900 of FIG. 9, e.g., the housing 1101 slides within the shell 901 (e.g., enclosure). Tongue 902 may be (e.g., fixedly) disposed within the bore of the shell 901 of the serial bus receptacle. Depicted tongue 902 includes a first (e.g., substantially planar) side 904 and an opposing second (e.g., substantially planar) side 905. In one embodiment, first side 904 is (e.g., substantially) parallel to the second side 905. One or both of first side 904 and second side 905 may include electrical contacts (e.g., pins, pads, springs, etc.) thereon, e.g., facing in opposing directions. A longitudinal axis of each electrical contact may extend from the rear of shell 901 towards the opening at the front of shell 901, for example, along the first side 904 and/or the second side 905. A leading edge 903 of the tongue 902 may be (e.g., substantially) perpendicular to the first side 904 and the second side 905. The body of the tongue 902, e.g., excluding any electrical contacts thereon, may be a non-conductive material, for example, glass-filled nylon. The leading edge 903 of the tongue 902 may not include any electrical contacts to mate with the electrical (for example, signal and/or data, e.g., but not ground) contacts of a plug. The back wall of the receptacle may not include any electrical contacts to mate with the electrical (for example, signal and/or data, e.g., but not ground) contacts of a plug. First side 904 may include (e.g., only) a first row of electrical contacts thereon, for example, the electrical contacts (e.g., pins) in FIG. 10, e.g., pins A1-A12. Second side 905 may include (e.g., only) a second row of electrical contacts thereon, for example, the electrical contacts (e.g., pins) in FIG. 10, e.g., pins B12-B1. Electrical contacts may physically connect (e.g., fixedly connect) to the circuitry of a device, e.g., a multiple role togging circuit or other circuitry discussed herein.

Turning again to FIG. 11, in certain embodiments, the serial bus plug 1100 includes a housing 1101 with a bore therein, e.g., having an opening at the front of the housing 1101 and a back wall opposite of the opening. Housing 1101 may include electrical contacts in the bore thereof. A first side 1104 of the interior of the housing may be (e.g., substantially) parallel to a second side 1105 of the interior of the housing of the serial bus plug 1100. One or both of first side 1104 and second side 1105 may include electrical contacts (e.g., pins, pads, springs, etc.) thereon, e.g., facing each other. Contacts on the first side 1104 and/or the second side 1105 may couple (e.g., physically and electrically connect) to the first side 904 and/or the second side 905 of receptacle 900. In one embodiment, a first side 1104 of plug 1100 couples with either of the first side 904 and the second side 905 of the receptacle 900 and the second side 1105 of the plug 1100 couples with the other of the first side 904 and the second side 905 of the receptacle 900 (e.g., flip-able). A longitudinal axis of each electrical contact may extend from the rear of housing 1101 towards the opening 1102 at the front of housing 1101, for example, along the first side 1104 and/or the second side 1105. Housing 1101 may be slideably received within an (e.g., continuous) annulus formed between the exterior surface of the tongue 902 and an interior surface of the shell 901 of the receptacle 900. The leading edge of the housing 1101 not include any electrical contacts to mate with the electrical (for example, signal and/or data, e.g., but not ground) contacts of a receptacle. The back wall of the housing 1101 may not include any electrical contacts to mate with the electrical (for example, signal and/or data, e.g., but not ground) contacts of a receptacle. First side 1104 may include (e.g., only) a first row of electrical contacts thereon, for example, the electrical contacts (e.g., pins) in FIG. 12, e.g., pins A12-A1. Second side 1105 may include (e.g., only) a second row of electrical contacts thereon, for example, the electrical contacts (e.g., pins) in FIG. 14, e.g., pins B1-B12. Electrical contacts may physically connect (e.g., fixedly connect) to a cable 1103 or other electrical conductors (for example, wires to a memory device, e.g., a USB memory stick). Cable 1103 may connect to another plug, e.g., to connect to a receptacle that physically connects to the circuitry of a device, e.g., a multiple role togging circuit or other circuitry discussed herein.

Circuitry here may include a transmitter and/or a receiver to send and receive data, respectively, e.g., as part of a transceiver (e.g., a physical layer (PHY) circuit).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing power for Universal Serial Bus (USB) ports, the method comprising:
  presenting an advertisement of a default power supply to a USB device connected to a USB port;
  receiving power attribute information from a USB device configuration descriptor during USB device enumeration, in response to determining the USB device does not support USB power delivery (USB PD) and after presenting the advertisement, where the advertisement is a resistance level associated with a default power supply; and
  dynamically changing the power supply to meet power requirements of the USB device identified by the power attribute information.

2. The method of claim 1, further comprising:
  determining whether the USB device supports USB PD.

3. The method of claim 1, further comprising:
  utilizing default power supply for the USB device until USB device enumeration completes and power attribute information is reported by an operating system policy manager level function.

4. The method of claim 1, further comprising:
determining whether the default power supply matches the power requirements of the USB device.

5. The method of claim 1, wherein the USB device is a Type-C device.

6. The method of claim 1, wherein dynamically changing the power supply increases the power supply to a maximum supported by the USB device or decreases the power supply to a minimum supported by the USB device.

7. A computing device supporting power management for Universal Serial Bus (USB), the computing device comprising:
an interface to communicate with a set of USB ports; and
a processing device coupled to the interface, the processing device to execute an operating system policy manager (OPM), the OPM to include a device policy manager (DPM) to implement power management for the set of USB ports, the OPM supporting an extension of the DPM, the extension of the DPM to access USB device configuration descriptors of USB devices connected to the set of USB ports, after presenting an advertisement of a default power supply to the USB devices, where the advertisement is a resistance level associated with a default power supply, the extension to determine power information for the USB devices and provide the power information to the DPM.

8. The computing device of claim 7, wherein the OPM includes USB bus drivers that perform an enumeration process.

9. The computing device of claim 8, wherein the extension of the DPM is an extension block in the USB bus driver.

10. The computing device of claim 7, wherein the extension is a user space daemon.

11. The computing device of claim 7, wherein the extension parses the USB device configuration descriptor each time the USB device configuration descriptor is modified or created.

12. The computing device of claim 7, wherein the set of USB ports are Type-C.

13. The computing device of claim 7, wherein the power information specifies a maximum power supply of the connected USB device.

14. A non-transitory computer-readable medium having stored therein a set of instructions, which when executed by a controller or processor, cause the controller or processor to perform a set of operations, the set of operations to manage power management for Universal Serial Bus (USB) connectors and a plurality of USB devices, the set of operations comprising:
providing a default power supply to each USB device that connects, where the default power supply is advertised as a resistance level associated with the default power supply;
determining power requirements for each USB device using USB power delivery (USB PD) and by parsing USB device configuration descriptors to determine power requirements of each USB device that does not support USB PD after providing the default power supply; and
allotting power supply to each USB device according to negotiated USB PD power level and determined power requirements of each USB device that does not support USB PD.

15. The non-transitory computer-readable medium of claim 14, having further instructions stored therein, which when executed cause the controller or processor to perform additional operations comprising:
receiving the power requirements after USB device enumerations from a device policy manager extension.

16. The non-transitory computer-readable medium of claim 14, having further instructions stored therein, which when executed cause the controller or processor to perform additional operations comprising:
detecting whether each USB device supports USB PD.

17. The non-transitory computer-readable medium of claim 14, having further instructions stored therein, which when executed cause the controller or processor to perform additional operations comprising:
changing power allotment to each USB device in response to changes in the power requirements of each USB device.

18. The non-transitory computer-readable medium of claim 14, having further instructions stored therein, which when executed cause the controller or processor to perform additional operations comprising:
advertising the default power supply to each USB device at time of connection.

19. The non-transitory computer-readable medium of claim 14, wherein the default power supply is provided to each USB Type-C device that does not support USB PD.

* * * * *